(12) United States Patent  
Barnes et al.

(10) Patent No.: US 8,713,122 B2  
(45) Date of Patent: Apr. 29, 2014

(54) MESSAGE VALUE INDICATOR

(75) Inventors: Thomas H. Barnes, Austin, TX (US); Dawn M. Canelones, Pflugerville, TX (US); Carol S. Walton, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1781 days.

(21) Appl. No.: 11/272,515

(22) Filed: Nov. 10, 2005

(65) Prior Publication Data

US 2007/0106738 A1     May 10, 2007

(51) Int. Cl.
*G06F 15/16* (2006.01)
*H04L 12/58* (2006.01)

(52) U.S. Cl.
CPC ............ *H04L 12/585* (2013.01); *H04L 12/584* (2013.01); *H04L 12/5875* (2013.01)
USPC .......................................... 709/207; 709/206

(58) Field of Classification Search
USPC ................................................. 709/206, 207
See application file for complete search history.

(56) References Cited

U.S. PATENT DOCUMENTS

| | | | |
|---|---|---|---|
| 5,905,991 A | 5/1999 | Reynolds | |
| 6,178,442 B1 | 1/2001 | Yamazaki et al. | |
| 6,453,327 B1 * | 9/2002 | Nielsen | 715/205 |
| 6,604,198 B1 | 8/2003 | Beckman et al. | |
| 6,615,242 B1 * | 9/2003 | Riemers | 709/206 |
| 6,782,414 B1 | 8/2004 | Xue et al. | |
| 6,868,498 B1 | 3/2005 | Katsikas | |
| 7,519,668 B2 | 4/2009 | Goodman et al. | |
| RE41,899 E * | 10/2010 | Rose et al. | 706/46 |
| 2002/0019848 A1 | 2/2002 | Sugaware et al. | |
| 2002/0062368 A1 * | 5/2002 | Holtzman et al. | 709/224 |
| 2002/0143871 A1 | 10/2002 | Meyer et al. | |
| 2002/0163538 A1 * | 11/2002 | Shteyn | 345/752 |
| 2003/0018723 A1 | 1/2003 | Almeda et al. | |
| 2004/0054741 A1 * | 3/2004 | Weatherby et al. | 709/206 |
| 2004/0177110 A1 * | 9/2004 | Rounthwaite et al. | 709/202 |
| 2004/0243844 A1 * | 12/2004 | Adkins | 713/201 |
| 2004/0249934 A1 | 12/2004 | Anderson et al. | |
| 2005/0004988 A1 | 1/2005 | Farry | |
| 2005/0097174 A1 * | 5/2005 | Daniell | 709/206 |
| 2005/0114452 A1 * | 5/2005 | Prakash | 709/206 |
| 2006/0010217 A1 * | 1/2006 | Sood | 709/206 |
| 2006/0017983 A1 * | 1/2006 | Syri et al. | 358/402 |
| 2006/0031306 A1 * | 2/2006 | Haverkos | 709/206 |
| 2006/0101120 A1 * | 5/2006 | Helsper et al. | 709/206 |
| 2007/0106737 A1 | 5/2007 | Barnes et al. | |

OTHER PUBLICATIONS

Non-final office action dated Aug. 21, 2008 regarding U.S. Appl. No. 11/272,513, 12 pages.

(Continued)

*Primary Examiner* — Kenny Lin
(74) *Attorney, Agent, or Firm* — Yee & Associates, P.C.; Arthur Samodovitz (57) ABSTRACT

The Email Value Indicator comprises a computer implemented system and method for indicating the value of an email message. The system and method comprise collecting message values assigned to the email message; calculating a composite message value based on the collected message values; and inserting the composite message value into the email message. In additional embodiments, the system and method further comprises the steps of displaying the composite message value in an email reader, sorting the email message based on the composite message value, and calculating the composite message value based on selected message values.

25 Claims, 4 Drawing Sheets

(56) References Cited

OTHER PUBLICATIONS

Final office action dated Feb. 4, 2009 regarding U.S. Appl. No. 11/272,513, 7 pages.

Non-final office action dated Sep. 4, 2009 regarding U.S. Appl. No. 11/272,513, 10 pages.

Final office action dated Feb. 19, 2010 regarding U.S. Appl. No. 11/272,513, 12 pages.

* cited by examiner

MESSAGE VALUE INDICATOR

FIELD OF THE INVENTION

The present invention is related to electrical computers and digital processing systems, and specifically to priority based messaging.

BACKGROUND OF THE INVENTION

Email systems allow people to distribute the same message to multiple recipients. Messages distributed to multiple recipients are often referred to as "group messages". Although the sender may consider the content of the message to be important, some recipients might disagree on the value of the message. Unsolicited email messages, particularly unsolicited group messages, are commonly referred to as "SPAM". Some SPAM comes from innocent sources such as overly enthusiastic friends and relatives forwarding a joke to everyone in their address book. Other times, however, SPAM is the result of mass marketing or even a computer virus.

Another problem with group messages arises in the workplace. In an effort to communicate information across large working groups, messages are often sent to large groups of recipients. Many of the recipients really do not need the information. Workers become inundated with a high volume of unnecessary or repetitive messages. Dealing with and filtering out all these messages takes time and network bandwidth, resulting in a drop in productivity.

Many email readers and other commercial products are designed to identify and filter SPAM. SPAM filters use sender information, subject lines and even message content to identify unwanted email messages. Commercial SPAM filters can be effective for most commercial group messages, but are less effective in the situation of internal corporate communications. Workers at a company generally expect to receive individual or group messages from co-workers. Conventional SPAM filters often remove the relevant along with the irrelevant when used to filter out internal corporate communications. This problem of over-filtering group messages not only applies to the corporate world, but to other groups such as clubs, civic organizations, educational institutions or even families.

Thus, a need exists for an alternative to conventional SPAM filters that enables a user to manage the flow of information through email messages while minimizing the potential for over-filtering.

SUMMARY OF THE INVENTION

The invention meeting the need identified above comprises a computer implemented system and method for indicating the value of an email message. The system and method comprise collecting message values assigned to the email message; calculating a composite message value based on the collected message values; and inserting the composite message value into the email message. In additional embodiments, the system and method further comprises the steps of displaying the composite message value in an email reader, sorting the email message based on the composite message value, and calculating the composite message value based on selected message values.

BRIEF DESCRIPTION OF DRAWINGS

The novel features believed characteristic of the invention are set forth in the appended claims. The invention itself, however, as well as a preferred mode of use, further objectives and advantages thereof, will be understood best by reference to the following detailed description of an illustrative embodiment when read in conjunction with the accompanying drawings, wherein:

FIG. 3 is a flow chart of the Email Plug-in.

DETAILED DESCRIPTION OF THE PREFERRED EMBODIMENT

The principles of the present invention are applicable to a variety of computer hardware and software configurations. The term "computer hardware" or "hardware," as used herein, refers to any machine or apparatus that is capable of accepting, performing logic operations on, storing, or displaying data, and includes without limitation processors and memory; the term "computer software" or "software," refers to any set of instructions operable to cause computer hardware to perform an operation. A "computer," as that term is used herein, includes without limitation any useful combination of hardware and software, and a "computer program" or "program" includes without limitation any software operable to cause computer hardware to accept, perform logic operations on, store, or display data. A computer program may, and often is, comprised of a plurality of smaller programming units, including without limitation subroutines, modules, functions, methods, and procedures. Thus, the functions of the present invention may be distributed among a plurality of computers and computer programs. The invention is described best, though, as a single computer program that configures and enables one or more general-purpose computers to implement the novel aspects of the invention. For illustrative purposes, the inventive computer program will be referred to as the Email Value Indicator or "EVI".

Figure 1:
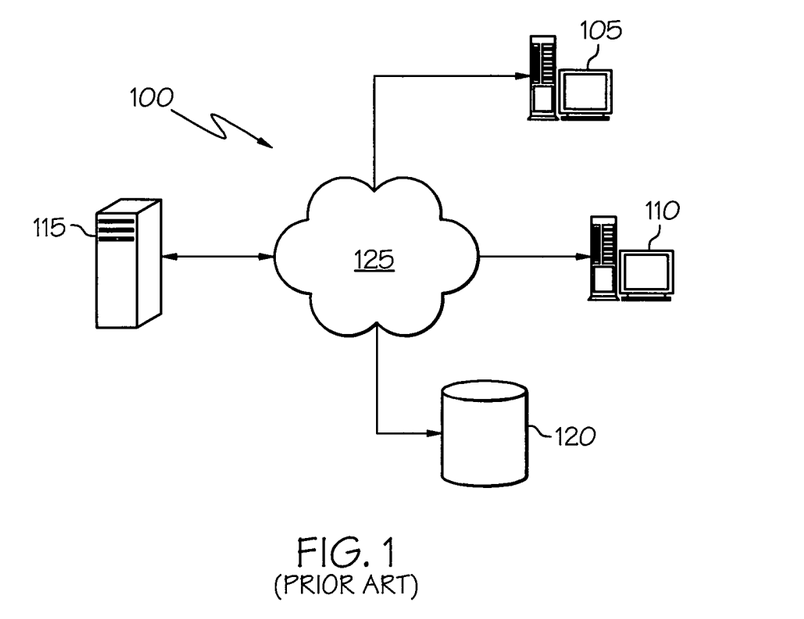
FIG. 1 represents an exemplary computer network.

Additionally, the EVI is described below with reference to an exemplary network of hardware devices, as depicted in FIG. 1. A "network" comprises any number of hardware devices coupled to and in communication with each other through a communications medium, such as the Internet. A "communications medium" includes without limitation any physical, optical, electromagnetic, or other medium through which hardware or software can transmit data. For descriptive purposes, exemplary network 100 has only a limited number of nodes, including workstation computer 105, workstation computer 110, server computer 115, and persistent storage 120. Network connection 125 comprises all hardware, software, and communications media necessary to enable communication between network nodes 105-120. Unless otherwise indicated in context below, all network nodes use publicly available protocols or messaging services to communicate with each other through network connection 125.

Figure 2:
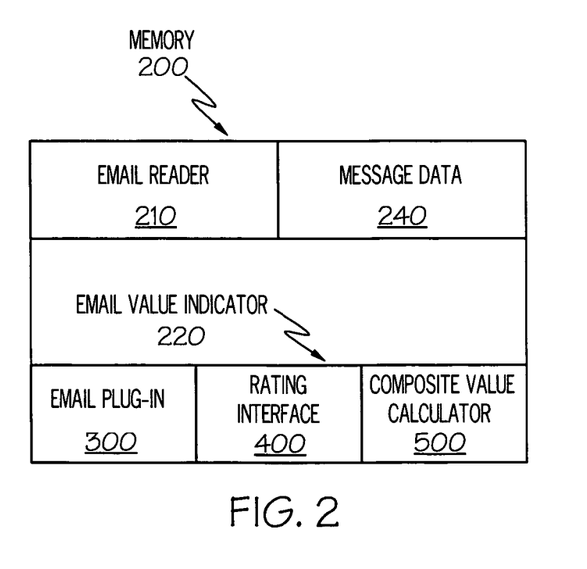
FIG. 2 describes programs and files in memory on a computer.

EVI 220 typically is stored in a memory, represented schematically as memory 200 in FIG. 2. The term "memory," as used herein, includes without limitation any volatile or persistent medium, such as an electrical circuit, magnetic disk, or optical disk, in which a computer can store data or software for any duration. A single memory may encompass and be distributed across a plurality of devices. "The term "computer-readable" storage device does not encompass a signal propagation media such as a copper cable, optical fiber and wireless transmission media." Thus, FIG. 2 is included merely as a descriptive expedient and does not necessarily reflect any particular physical embodiment of memory 200. As depicted in FIG. 2, though, memory 200 may include additional data and programs. Of particular importance to EVI 220, memory 200 may include Email Reader 210 and Message Data 240. Email Reader 210 represents any software capable of allowing users to receive, read, create, and send email, including any Internet browser program that interfaces with an email reader at a remote location. Message Data 240 is a file readable by Email Reader 210. Message Data 240 may be replicated in local memory, as shown here, or may actually be stored at a centralized location, such as an exchange-based mail server. EVI 220 has three components: Email Plug-In 300, Rating Interface 400, and Composite Value Calculator 500. Rating Interface 400 allows recipients of a message to assign a value to the message, which is stored in the recipient's copy of Message Data 240 and transmitted back to the message originator for storage in original Message Data 240. Composite Value Calculator 500 collects the values from Message Data 240 and calculates a composite value. Email Plug-In 300 inserts the composite value into the message header. Email Reader 210 can display the composite value and use the composite value to sort email messages by importance. EVI 220 is particularly suited for group messages, but also is applicable generally to all types of email messages. EVI 220 is described below in its broadest application.

Figure 3:
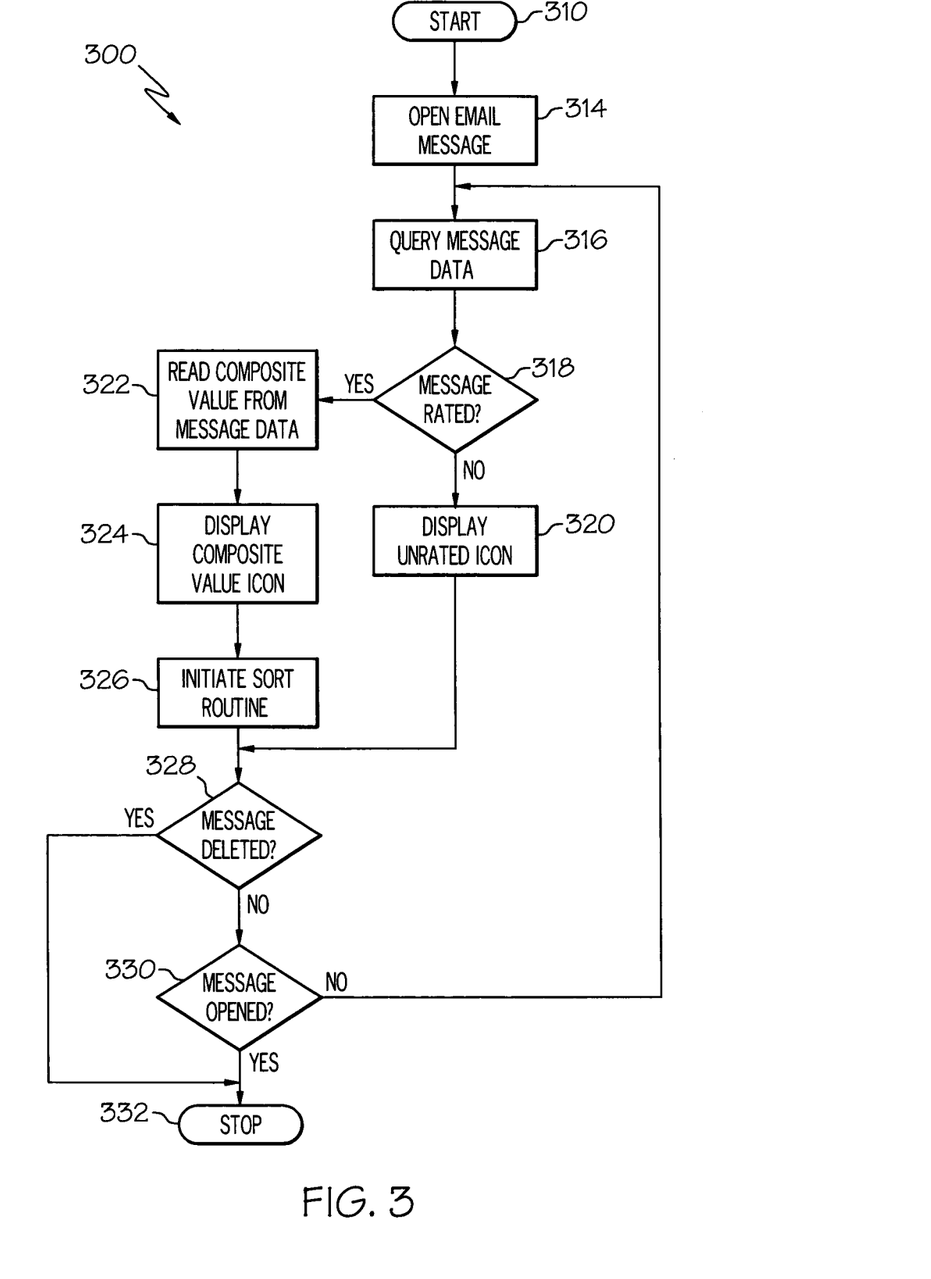

FIG. 3 is a flowchart of Email Plug-In 300. The Email Plug-in starts (310) when a message is received. Email Plug-in 300 opens the recipient's copy of Message Data 240 (314) and queries Message Data 240 (316) to determine if the message has a composite value (318). If the message has no composite value, Email Reader 210 displays an unrated message icon (320). The unrated message icon may be, for example, part of the subject line or a separate indicator on Email Reader 210. The icon may include any combination of colors, symbols, numbers or other characters. If the message has a composite value, Email Reader 210 reads the composite value from Message Data 240 (322) and displays a message composite value icon (324). The icon may be, for example, part of the subject line or a separate indicator on Email Reader 210. The composite value icon may include any combination of colors, symbols, numbers or other characters. Email Plug-in 300 initiates a sort routine on Email Reader 210 to prioritize the message based on the composite value (326). Most email readers include a sort routine. Sort routines determine what order to display messages in Email Reader 210. Sort routines also can move messages to different folders or delete messages. After the sort routine finishes, Email Plug-in 300 determines if the sort routine or the recipient deleted the message (328). When the recipient or the sort routine deletes the message, Email Plug-in 300 stops (332). When the recipient opens the message (330), Email Plug-in 300 stops (332). Email Plug-in 300 continues to query Message Data 240, display the message composite value, and initiate the sort routine until the message is either deleted or opened (316-330).

Figure 4:
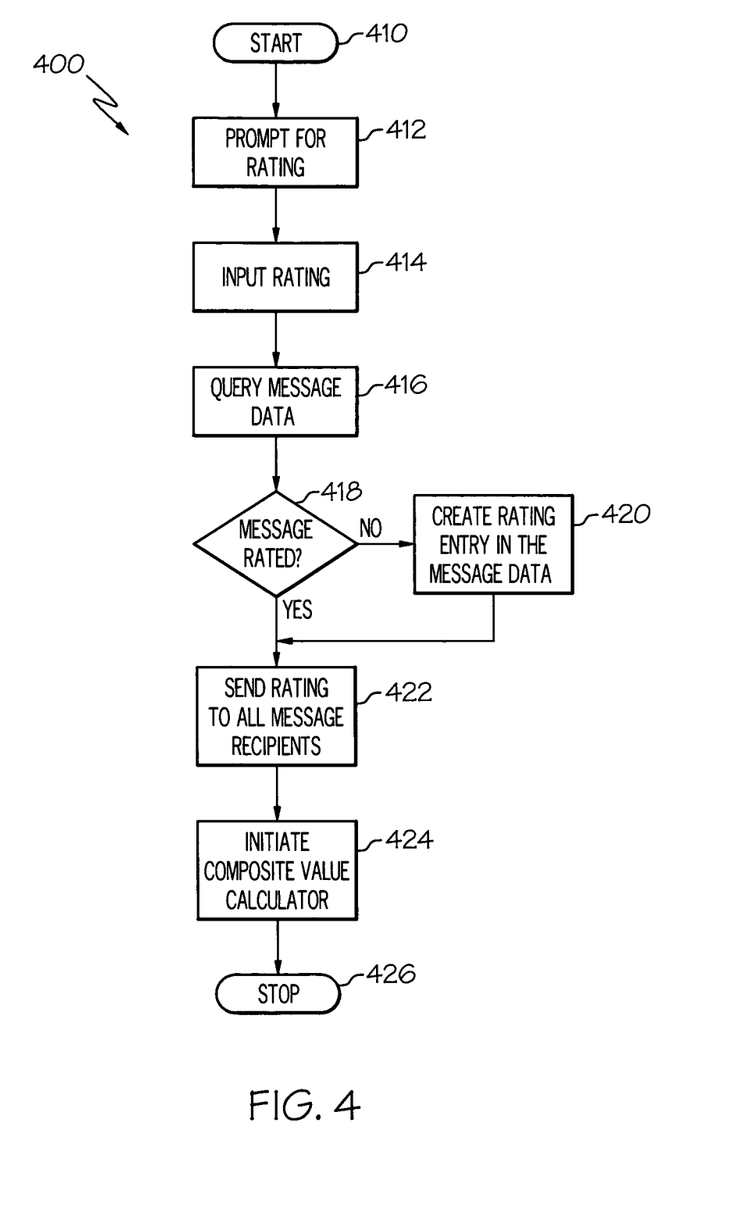
FIG. 4 is a flow chart of the Rating Interface.

FIG. 4 is a flowchart of Rating Interface 400. Whenever a message is opened, Rating Interface 400 starts (410). Rating Interface 400 may appear in a dialog box or separate window from mail reader 210. Rating Interface 400 prompts the message recipient to assign a value to the message (412). Table 1 shows possible values in one embodiment of the invention:

TABLE 1

| 1 | This message is very relevant to me. |
| 2 | This message is marginally relevant to me. |

TABLE 1-continued

| 3 | This message is not relevant to me. |
| 4 | This message is definitely SPAM. |
| 5 | This message may contain a virus. |
| 6 | Remove me from this list. |

The recipient enters the value (414), for example, by selecting a radio button or check box. Rating Interface 400 opens Message Data 240 (416) and determines if the current message has a rating entry yet (418). If Message Data 240 has no rating entry, Rating Interface 400 creates an entry for the rating in Message Data 240 (420). Rating Interface 400 sends the assigned value to the originator and all other recipients of Message Data 240 (422), much like the 'Reply to All' function found in most popular email readers. Rating Interface 400 may perform other functions not shown here, such as creating and sending an email to the message sender if the recipient wants to be removed from the list or the recipient suspects the message contained a virus.

Figure 5:
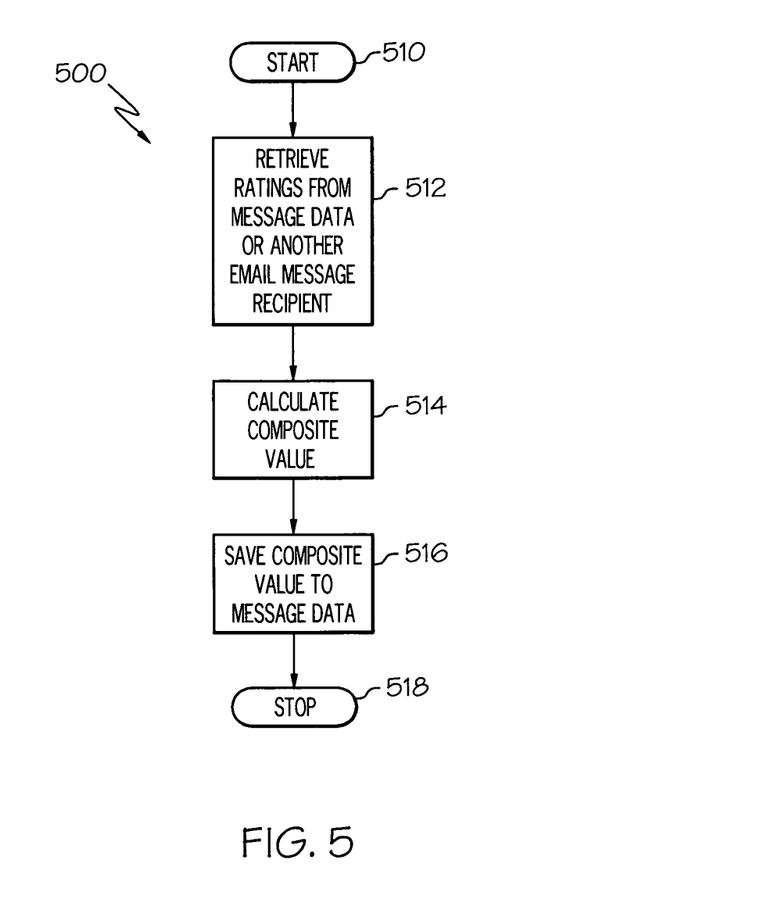
FIG. 5 is a flow chart of the Composite Value Indicator.

Value Calculator 500 is illustrated in FIG. 5. Composite Value Calculator 500 starts when Message Data 240 is displayed by Email Reader 210, and whenever a value indicator is received from another recipient of Message Data 240 (510). Composite Value Calculator 500 collects the individual message values from Message Data 240 (512) and calculates a composite value (514). In one embodiment, the composite value is an average of the message values, truncated or rounded to the nearest integer. Composite Value Calculator 500 saves the calculated composite value to Message Data 240 (516) and stops (518). Other embodiments of Composite Value Calculator 500 may perform a statistical analysis of the values and forward values and calculations to the sender of the message.

An additional embodiment of EVI 220 allows a message originator to define a "peer group evaluator profile." The peer group evaluator profile only allows EVI 220 to accept assigned values from designated members of a group. When a message originator activates a peer group evaluator profile, EVI 220 excludes message values from recipients not in the designated group. The group is defined, for example, by adding an attribute to the contact information of entries in an address book of Email Reader 210. In this embodiment, EVI 220 includes a filter at Composite Value Calculator 500 that only accepts message value indicators sent by members of the group.

A preferred form of the invention has been shown in the drawings and described above, but variations in the preferred form will be apparent to those skilled in the art. The preceding description is for illustration purposes only, and the invention should not be construed as limited to the specific form shown and described. The scope of the invention should be limited only by the language of the following claims.

What is claimed is:

1. A method for indicating a relevance of an email, the method comprising the steps of:

a computer receiving from a first recipient of the email a first report of a measure of relevance of the email to the first recipient as assigned by the first recipient;

the computer receiving from a second recipient of the email a second report of a measure of relevance of the email to the second recipient as assigned by the second recipient;

the computer calculating an average measure of relevance value of the email by averaging the first and second measures of relevance of the email assigned by the first and second recipients of the email, respectively, wherein the average measure of relevance value indicates an average degree of relevance of the email to the first recipient and to the second recipient; and the computer inserting an icon into a subject line of the email to represent the average measure of relevance value and directing display of the email in an email reader of a third recipient of the email in an order position in the email reader of the third recipient relative to other emails in the email reader of the third recipient, wherein the order position is based in part on the average measure of relevance value of the email for which the average measure of relevance value was calculated.

2. The method of claim 1, further comprising the step of:
the computer receiving and storing the first measure of relevance and the second measure of relevance, the first measure of relevance and the second measure of relevance selected by the first recipient and the second recipient respectively from a predefined group of numbers, each of the numbers representing one of: a different one of a plurality of different degrees of relevance of the email to a recipient, whether the email is SPAM, whether the email might contain a virus, and whether the recipient wants to be removed from an email list.

3. The method of claim 2, further comprising the steps of:
the computer subsequently receiving a plurality of additional measures of relevance from a respective plurality of additional recipients of the email; and
the computer calculating a new average measure of relevance value based on the first measure of relevance, the second measure of relevance, and the plurality of additional measures of relevance.

4. The method of claim 3, further comprising the steps of:
the computer performing a statistical analysis of the first measure of relevance, the second measure of relevance, and the plurality of additional measures of relevance; and
the computer sending a calculation of the statistical analysis to a sender of the email.

5. The method of claim 1, further comprising the steps of:
the computer receiving a definition of a group of people who are empowered to evaluate relevance of emails;
the computer subsequently receiving third and fourth measures of relevance from third and fourth recipients of the email, the first, second and third recipients being members of the group, the fourth recipient not being a member of the group, and in response, the computer calculating a new average measure of relevance value based on the first, second and third measures of relevance but not the fourth measure of relevance, the new average measure of relevance value indicating an average degree of relevance of the email.

6. The method of claim 1, further comprising:
the computer receiving, by the third recipient, a second email that has a second average measure of relevance value;
the computer receiving, by the third recipient, a third email that has a third average measure of relevance value that is greater than the second average measure of relevance value indicating that the third email is more relevant than the second email; and
the computer positioning the third email ahead of the second email.

7. The method of claim 1, further comprising:
the computer, in response to inserting the average measure of relevance value into the email, inserting characters into the subject line of the email on the email reader indicating the email has been rated.

8. The method of claim 1, further comprising:
the computer, for each email recipient of the email, receiving a corresponding measure of relevance, each corresponding measure of relevance being a number selected by a recipient of the email, the number corresponding to a factor of relevance, wherein the factor of relevance is included in the calculation of the average measure of relevance value of the email.

9. The method of claim 8, further comprising:
the computer receiving, for each email recipient of the email, a corresponding average measure of relevance, each average measure of relevance calculated in response to receipt of the number selected by the recipient and a calculation of an average of all message relevance values received for an email up to and including a last email.

10. The method of claim 8, further comprising:
the computer, responsive to receiving each updated average measure of relevance, ordering a list of emails, at least in part, in accordance with relative average measures of relevance of the emails.

11. The method of claim 10, further comprising:
wherein, each recipient of the email receives an average measure of relevance value displayed in the subject line of the email in an email reader of the recipient.

12. A computer system for indicating a relevance of an email, the computer system comprising:
one or more processors, one or more computer-readable memories, one or more computer-readable storage devices, and program instructions stored on the one or more storage devices for execution by the one or more processors via the one or more memories, the program instructions comprising:
program instructions for receiving from a first recipient of the email a first report of a measure of relevance of the email to the first recipient as assigned by the first recipient;
program instructions for receiving from a second recipient of the email a second report of a measure of relevance of the email to the second recipient as assigned by the second recipient;
program instructions for calculating an average measure of relevance value of the email by averaging the first and second measures of relevance of the email assigned by the first and second recipients of the email, respectively, wherein the average measure of relevance value indicates an average degree of relevance of the email to the first recipient and to the second recipient; and
program instructions for inserting an icon into a subject line of the email to represent the average measure of relevance value and directing display of the email in an email reader of a third recipient of the email in an order position in the email reader of the third recipient relative to other emails in the email reader of the third recipient, wherein the order position is based in part on the average measure of relevance value of the email for which the average measure of relevance value was calculated.

13. The computer system of claim 12, further comprising:
program instructions for receiving and storing the first measure of relevance and the second measure of relevance, the first measure of relevance and the second measure of relevance selected by the first recipient and the second recipient respectively from a predefined group of numbers, each of the numbers representing one of: a different one of a plurality of different degrees of relevance of the email to a recipient, whether the email is SPAM, whether the email might contain a virus, and whether the recipient wants to be removed from an email list.

14. The computer system of claim 13, further comprising:
program instructions for subsequently receiving a plurality of additional measure of relevance from a respective plurality of additional recipients of the email; and
program instructions for calculating a new average measure of relevance value based on the first measure of relevance, the second measure of relevance, and the plurality of additional measures of relevance.

15. The computer system of claim 14, further comprising:
program instructions for performing a statistical analysis of the first measure of relevance, the second measure of relevance, and the plurality of additional measures of relevance; and
program instructions for sending a calculation of the statistical analysis to a sender of the email.

16. The computer system of claim 12, further comprising:
program instructions for receiving a definition of a group of people who are empowered to evaluate relevance of emails;
program instructions for subsequently receiving third and fourth measures of relevance from third and fourth recipients of the email, the first, second and third recipients being members of the group, the fourth recipient not being a member of the group, and in response, the computer calculating a new average measure of relevance value based on the first, second and third measure of relevance but not the fourth measure of relevance, the new average measure of relevance value indicating an average degree of relevance of the email.

17. The computer system of claim 12, further comprising:
program instructions for receiving, by the third recipient, a second email that has a second average measure of relevance value;
program instructions for receiving, by the third recipient, a third email that has a third average measure of relevance value that is greater than the second average measure of relevance value indicating that the third email is more relevant than the second email; and
program instructions for positioning the third email ahead of the second email.

18. The computer system of claim 12, further comprising:
program instructions, in response to inserting the average measure of relevance value into the email, inserting characters into the subject line of the email on the email reader indicating the email has been rated and sending the email to an originator of the email.

19. A computer program product for indicating a relevance of an email, the computer program product comprising:
one or more computer-readable storage devices and program instructions stored on the one or more storage devices, the program instruction comprising:
program instructions for receiving from a first recipient of the email a first report of a measure of relevance of the email to the first recipient as assigned by the first recipient;
program instructions for receiving from a second recipient of the email a second report of a measure of relevance of the email to the second recipient as assigned by the second recipient;
program instructions for calculating an average measure of relevance value of the email by averaging the first and second measures of relevance of the email assigned by the first and second recipients of the email, respectively, wherein the average measure of relevance value indicates an average degree of relevance of the email to the first recipient and to the second recipient; and
program instructions for inserting an icon into a subject line of the email to represent the average measure of relevance value and directing display of the email in an email reader of a third recipient of the email in an order position in the email reader of the third recipient relative to other emails in the email reader of the third recipient, wherein the order position is based in part on the average measure of relevance value of the email for which the average measure of relevance value was calculated.

20. The computer program product of claim 19, further comprising:
program instructions for receiving and storing the first measure of relevance and the second measure of relevance, the first measure of relevance and the second measure of relevance selected by the first recipient and the second recipient respectively from a predefined group of numbers, each of the numbers representing one of: a different one of a plurality of different degrees of relevance of the email to a recipient, whether the email is SPAM, whether the email might contain a virus, and whether the recipient wants to be removed from an email list.

21. The computer program product of claim 20, further comprising:
program instructions for receiving a plurality of additional measures of relevance from a respective plurality of additional recipients of the email; and
program instructions for calculating a new average measure of relevance value based on the first measure of relevance, the second measure of relevance, and the plurality of additional measure of relevance.

22. The computer program product of claim 21, further comprising:
program instructions for performing a statistical analysis of the first measure of relevance, the second measure of relevance, and the plurality of additional measure of relevance; and
program instructions for sending a calculation of the statistical analysis to a sender of the email.

23. The computer program product of claim 19, further comprising:
program instructions for receiving a definition of a group of people who are empowered to evaluate relevance of emails;
program instructions for subsequently receiving third and fourth measures of relevance from third and fourth recipients of the email, the first, second and third recipients being members of the group, the fourth recipient not being a member of the group and in response, to calculate a new average measure of relevance value based on the first, second and third measure of relevance but not the fourth measure of relevance, the new average measure of relevance value-indicating an average degree of relevance of the email.

24. The computer program product of claim 19 further comprising:
program instructions for receiving, by the third recipient, a second email that has a second average measure of relevance value;
program instructions for receiving, by the third recipient, a third email that has a third average measure of relevance value that is greater than the second average measure of relevance value indicating that the third email is more relevant than the second email; and program instructions for positioning the third email ahead of the second email.

25. The computer program product of claim 19, further comprising:
program instructions for inserting, in response to inserting the average measure of relevance value into the email, characters into the subject line of the email on the email reader indicating the email has been rated and to send the email to an originator of the email.

\* \* \* \* \*